United States Patent
Austin

[15] 3,676,911
[45] July 18, 1972

[54] HOLDING TOOL

[72] Inventor: Frank C. Austin, 9 Meadow Road, Rockport, Mass. 01966

[22] Filed: Nov. 12, 1970

[21] Appl. No.: 88,754

[52] U.S. Cl. ..................................29/203 V, 29/557, 29/558
[51] Int. Cl. ....................................H05k 13/04, B23p 13/04
[58] Field of Search......................29/203 V, 557, 558, 203 B, 29/203; 76/101

[56] References Cited

UNITED STATES PATENTS 3,056,317  10/1962   Huber et al. .........................29/203 V
3,148,446  9/1964    Celovsky ................................29/557

Primary Examiner—Thomas H. Eager
Attorney—John N. Williams

[57] ABSTRACT

Tool for placing semiconductor chips has a receiving cavity of initial cross-section similar to and slightly larger than the chip, of depth less than the thickness of the chip and a second section inward of the initial section of shape similar thereto but having a changing shape in the corner regions. Proceeding from the first section inwardly, the cross-sections of the second section have progressively smaller corner dimensions; at a cavity depth less than the thickness of the chip these dimensions are smaller than the chip, providing corner regions upon which the chip rests when the cavity is evacuated to draw in a chip. Also a method of forming such a tool using a bar of electrode stock shaped in prism form with rounded end corner regions conforming to the projection of a cone pointed outwardly from the end. This electrode is used in an EDM process to form an impression in a blank of hard metal, and the surfaces surrounding the impression are machined to define thin walls to complete the tool. The electrode is redressed simply by rechucking the bar and returning the conical surface.

8 Claims, 7 Drawing Figures

Patented July 18, 1972 3,676,911

HOLDING TOOL

This invention relates to a tool for holding and accurately placing planar semiconductor chips having a predetermined shape and a thickness of a few thousandths of an inch.

Objects of the invention are to provide an improved tool for holding and positioning semiconductor chips and one which is simple to manufacture, prevents damage to the chips and can be made in an electrical discharge machine (EDM) where the male electrode can be easily, quickly, and inexpensively dressed with great accuracy after each use in the EDM.

The invention concerns a tool which defines a cavity for receiving the chip and a suction port for evacuating the space of the cavity to hold the chip therein. According to the invention the cavity features a first section having a cross section form, similar to and slightly larger than the predetermined form of the chip, for receiving one face of the chip, the first section having a depth less than the predetermined thickness of the chip. A second section of the cavity lies immediately adjacent to the first section, inwardly thereof, this second section being of similar cross sectional shape to the first section but having a changing shape in the corner regions. Proceeding from the first section inwardly, successive cross sections of the second section of the cavity have progressively smaller corner dimensions from that of the first section. The corner dimensions are smaller than the predetermined corner dimensions of the chip at a cavity depth less than the thickness of the chip whereby upon entry of a chip into the cavity under the influence of vacuum, the corners of the chip only seat upon the smaller dimensioned corner regions of the cavity. This simultaneously substantially closes the cavity from the entry of air and positions the chip with its outer face located beyond the limits of the cavity and exposed to be joined to a substrate.

Contact between the holding tool and the cavity is initially a point contact at the corners of the first held semiconductor chip. But immediately upon use, part of the cavity is slightly worn away at the corners of the chip in the ensuing frictional contact from, for example, scrubbing the chip into a substrate, normally gold. This wear provides a supporting ledge which contacts the face of the chip in the corner region. During use, forces pressing the holder toward the substrate are transmitted through the ledge to face areas of the chip in the corner regions, effective to assure proper contact of the chip with the substrate.

Additional objects and features of the present invention will become apparent upon consideration of the following description when taken in conjunction with the following drawings:

FIG. 4a is a perspective view of a corner portion of the holder after a ledge has been worn in.

Figure 1:
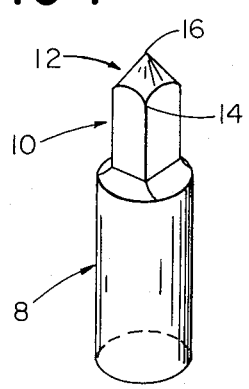
FIG. 1 is a perspective view of the completed male electrode.
Figure 1A:
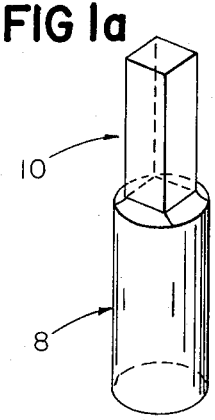
FIG. 1a is a perspective view of the male electrode without the conical form.

In the preferred embodiment, the EDM process is used to form the cavity of the holding tool. Functionally, a male tungsten electrode "burns" its impression into a blank of tungsten carbide. The male electrode is shown in FIG. 1. It is preferably formed from a circular cross section bar 8 of tungsten stock, one end of which has been previously chucked on its circular periphery in a metal working machine. On the other end, a rectangular cross section is machined to dimensions which will vary according to the dimensions of the rectangular semiconductor chip. The rectangular cross section will run for some distances along the axis of the electrode material forming a prism-like form 10 (FIG. 1a). It is assumed for clarity that the chip is rectangular, however it may be of any cross sectional form having corners. The cross section of the prism-like form will then be of similar shape. The prism-like electrode, still in the same chuck, is then tilted to an angle dependent upon the shape of the chip, and a cone 12 is ground by rotary means on the prism-like form 10 (FIG. 1). In this manner the male electrode is formed.

It is not necessary that a full cone be ground on the prism-like end; a truncated cone may be used. The only criterion is that the surface of the cone intersect each and every corner of a cross section of the prism, such as point 14 (FIG. 1). If a full cone is used, the tip or apex 16 of the cone will be on a projection of the longitudinal axis of the prism and perpendicular thereto. In the preferred embodiment of the invention, the included angle at the apex will typically be 90°, up to about 120°, but smaller or larger angles, such as the range 70° to 140°, could be used depending upon the thickness of the chip as will be described later.

Figure 2:
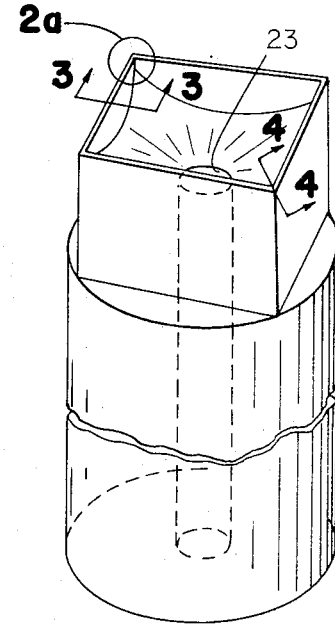
FIG. 2 is a perspective view of the cavity of the holder after the EDM process and after finishing.
Figure 3:
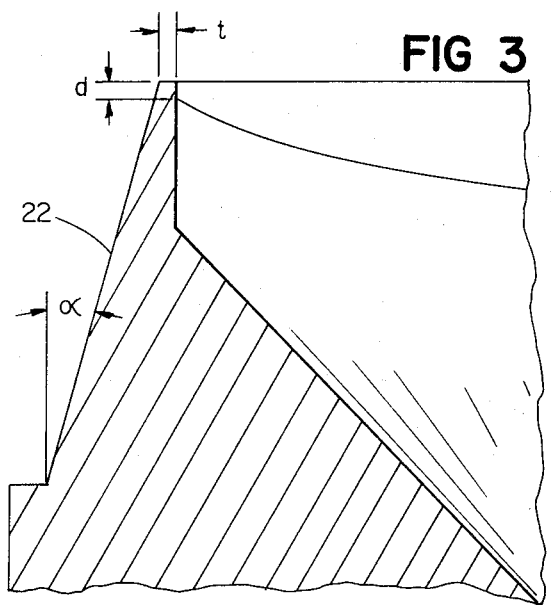
FIG. 3 is a cross section view of the holder taken on line 3—3 of FIG. 2.
Figure 2A:
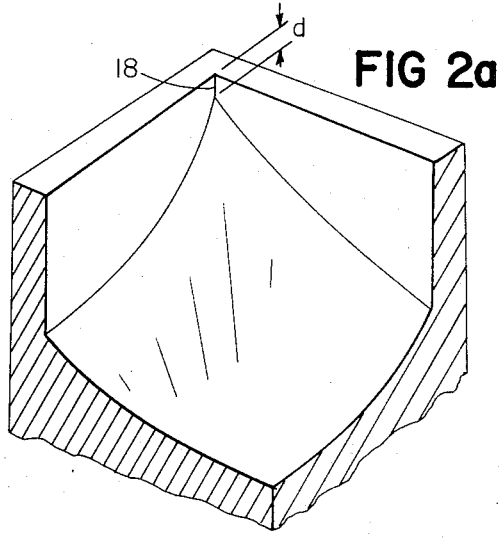
FIG. 2a is an enlarged view of one corner of the cavity of the holder.

The impression of the male electrode is left in a blank of hard metal, preferably tungsten carbide, by the EDM process to a depth slightly exceeding the extent of the conical corners. The result is shown in FIG. 2. The depth $d$ of straight side 18 (FIG. 2a) at the corner is no less than 0.002 inch deep. This corresponds to half the thickness of the thinnest chip which will be held by the tool. After the EDM process, the tool is finished by grinding the outside walls to a knife edge of approximately 0.002 inch, dimension $t$. The outside wall 22 (FIG. 3) may be either straight or angular, such as a 15° angle $\alpha$. Suction port 23 is provided in the holding tool, e.g., by a central bore in the original blank.

The holding tool is typically used with chips which vary in thickness from about 0.004 inch to 0.015 inch and which are composed of very fragile silicon carbide. In the preferred embodiment it is necessary to pick up and scrub the chips into a gold substrate.

The cavity, formed by the male electrode, has an inside dimension approximately 0.002 inch larger on a side than the chip which will be held. The clearance is allowed so that the chip will easily fit into the cavity.

Figure 4:
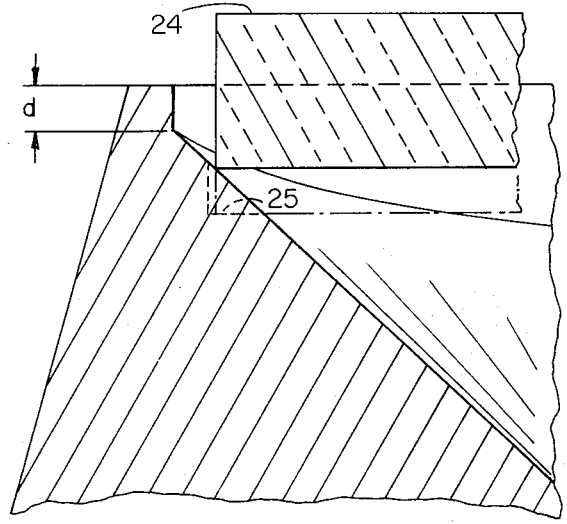
FIG. 4 is a cross section view of the holder taken on line 4—4 of FIG. 2, showing a chip sitting in the holder.
Figure 4A:
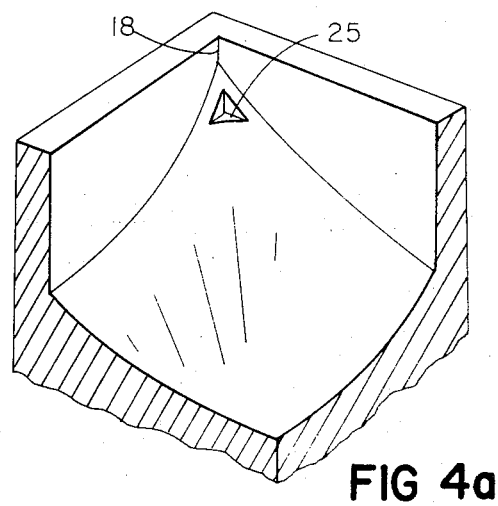

As noted previously, when the chip enters the cavity under the influence of vacuum, the chip seats in the cavity only at its corners regions (FIG. 4), the depth $d$ of the cavity being minimum at these corner regions. This minimum depth $d$ must be less than the thickness of the chip so that the outside face 24 of the chip will project beyond the body of the tool (FIG. 4). In actual practice the depth $d$ must be even smaller because the original and successive chips will wear the ledge 25 in the holding tool as a result of the constant vibrational type motion (scrubbing) to which the tool is subjected. This allows chips to settle deeper in the holder, this wear amounting perhaps to 0.002 inch depth over the life of the holding tool. The dotted lines of FIG. 4a show a corner of the holder with a ledge worn-in, and the semiconductor chip seated deeper in the cavity.

Since the downward forces of the tool pressing the chip against the substrate are transmitted through ledges 25 to the chip face at the corners, then even if a chip has an uneven edge, the corner faces of the chip will engage the corner regions of the tool, assuring accurate positioning.

Having once used the male electrode, the conical surface 12 must be remachined in order to use the male electrode to make another holding tool. The male electrode is easily dressed by chucking its circular periphery in a metal working machine thereby automatically achieving alignment of the prism-conical shape in a predetermined relation to a metal working tool and remachining the conical surface by rotary means to dress off imperfections of the electrode. The axis of the rod will be precisely aligned and therefore the newly dressed conical surface will intersect the corners of a cross section of the prism in the same manner as did the previous conical surface.

What is claimed is:

1. In a tool for placing planar semiconductor chips, the chips having a predetermined thickness on the order of a few thousandths of an inch and having parallel, oppositely directed broad faces of a predetermined form having corners, the tool comprising a body member having a cavity for receiving the chip and a suction port for evacuating the cavity to hold the chip against surfaces bounding said cavity, the improvement wherein said cavity comprises a first section having a cross section similar to and slightly larger than said predetermined form of said chip, for receiving one face of said chip, said first section having a depth less than said predetermined thickness of said chip, and a second section immediately adjacent to, inwardly of said first section, said second section being of cross sectional shape similar to that of said first section but having a changing shape in the corner regions, proceeding from said first section inwardly cross sections of said second section having progressively smaller corner dimensions from that of said first section, said corner dimensions being smaller than the predetermined corner dimensions of said chip at a total cavity depth less than the thickness of said chip whereby upon entry of a chip into said cavity under the influence of vacuum therein the corners of said chip only seat upon said smaller dimension corner regions of said cavity, simultaneously closing substantially the cavity from entry of air and positioning said chip with its outer face located beyond the limits of said cavity, whereby said chip is held with a face exposed for joining to a substrate.

2. The tool of claim 1 wherein said changing corner cross sections are defined by curved surfaces corresponding to a surface of revolution.

3. The tool of claim 2 wherein said predetermined chip form has all of its corners located on a circle projected from an axis of said form and said surface of revolution is centered on said axis.

4. The tool of claim 3 wherein said predetermined shape of said chip is rectangular, and all four corner surfaces of said second section of said cavity conform to an imaginary right conical surface having its apex located on an axis projected through the center of and perpendicular to said rectangle, said apex located at a point spaced inwardly from said second section.

5. The tool of claim 4 wherein the included angle of said conical surface is within the range of about 70° to 140°.

6. The tool of claim 1 wherein said tool comprises tungsten carbide.

7. The method of forming a holding tool for semiconductor chips of a predetermined shape, comprising providing a bar of electrode stock with an end portion in the form of a prism corresponding in cross section to said predetermined chip shape and forming rounded surfaces on the end of said prism at the corners where adjacent sides of the prism intersect, said rounded surfaces conforming generally to the projection of a cone pointed outwardly from said end, whereby to provide a male electrode form having flat sides and conically-surfaced corners at the end-most region immediately joined to a portion of full prismatic form, thereafter positioning said electrode adjacent a blank of hard metal, forming therein by EDM process an impression of the form of said electrode and thereafter machining the surfaces surrounding said impression to define thin walls.

8. The method of claim 7 in which said bar of electrode stock is of circular cross-section, said rounded surfaces are formed by chucking said stock by its circular periphery and by means of a metal turning tool forming a cone on the end of said bar and including the step, after formation of a holder tool by said use of said electrode according to the EDM process, of dressing the electrode to restore perfected surfaces for use in forming a subsequent tool, comprising chucking said electrode by its circular periphery, thereby automatically achieving alignment of said prism-conical shape in a predetermined relation to a metal working tool of said machine, and thereafter remachining said conical surface to dress off imperfections of said electrode.

* * * * *